(12) United States Patent
Nerone

(10) Patent No.: US 7,868,558 B2
(45) Date of Patent: Jan. 11, 2011

(54) ORGANIC LIGHT EMITTING DIODE POWER CONVERTER

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 569 days.

(21) Appl. No.: 11/986,340

(22) Filed: Nov. 21, 2007

(65) Prior Publication Data

US 2009/0128048 A1    May 21, 2009

(51) Int. Cl.
*H05B 37/02* (2006.01)
(52) U.S. Cl. ................... 315/226; 315/294; 315/307
(58) Field of Classification Search ......... 315/209 R, 315/226, 291, 294, 297, 307–308
See application file for complete search history.

(56) References Cited

U.S. PATENT DOCUMENTS

| | | | | |
|---|---|---|---|---|
| 4,544,863 | A * | 10/1985 | Hashimoto | 315/209 R |
| 5,841,648 | A | 11/1998 | Mansfield | |
| 5,936,599 | A * | 8/1999 | Reymond | 345/82 |
| 6,348,767 | B1 * | 2/2002 | Chen et al. | 315/224 |
| 6,411,045 | B1 | 6/2002 | Nerone | |
| 6,636,027 | B1 | 10/2003 | Nerone | |
| 6,853,150 | B2 * | 2/2005 | Clauberg et al. | 315/185 R |
| 2004/0189555 | A1 | 9/2004 | Capen et al. | |
| 2005/0225516 | A1 * | 10/2005 | Sempel | 345/76 |
| 2006/0279565 | A1 | 12/2006 | Wei et al. | |
| 2007/0146051 | A1 * | 6/2007 | Tsen | 327/536 |
| 2008/0116818 | A1 * | 5/2008 | Shteynberg et al. | 315/192 |
| 2008/0224627 | A1 * | 9/2008 | Genest | 315/224 |

FOREIGN PATENT DOCUMENTS

EP    1 788 850 B1    5/2007

OTHER PUBLICATIONS

PCT/US2008/078293 International Search Report, mailed Dec. 22, 2008.

* cited by examiner

*Primary Examiner*—Douglas W Owens
*Assistant Examiner*—Tung X Le
(74) *Attorney, Agent, or Firm*—Fay Sharpe LLP

(57) ABSTRACT

A power converter circuit converts an AC line signal to a DC signal for powering an organic light emitting diode. The circuit uses only capacitive elements to limit current to the LED. Inductive and resistive elements are not included in the circuit to limit current. The absence of inductive components eliminates electromagnetic interference generated by the circuit and avoids circuit components magnetically coupling to one another. The circuit includes complementary MOSFET switches that alternately conduct to convert the AC line voltage into a DC current for powering the LED.

22 Claims, 4 Drawing Sheets

US 7,868,558 B2

ORGANIC LIGHT EMITTING DIODE POWER CONVERTER

BACKGROUND

The present application relates to artificial lighting systems. It finds particular application when used in conjunction with organic light emitting diodes (OLEDs) and will be described with particular reference thereto. It is to be understood, however, that it is also applicable to applications that use silicon based diodes, or other inorganic semiconductors, and is not necessarily limited to the aforementioned application.

Incandescent lamps have found wide range success in the lighting industry, meeting a wide range of commercial demands. The incandescent lamp, however, does have several drawbacks that make it unsuitable for certain applications. For instance, the filament generates a substantial amount of heat, and the vacuum chamber that encapsulates the filament occupies a substantial amount of space. Additionally, incandescent filaments can be easily damaged, as they are sensitive to shock and vibration. Thus, it is impractical or impossible to use incandescent lamps for certain applications.

Light emitting diodes (LEDs) have demonstrated that they are a viable alternative to incandescent lamps in conventional roles, and can fulfill additional lighting roles where incandescent lamps cannot. LEDs have a robust, compact structure that makes them ideal for applications with space constraints, and applications prone to mechanical shock and vibration.

With such a stress in the industry on space savings, (e.g. cell phones, PDAs, laptops, flat panel displays, and the like) smaller is better. Even though the LEDs themselves are small, durable, and dissipate relatively little power, additional space is required by circuitry that supports the LED. Typically, the source current is much greater than the operating current of the LED. To limit the current to the LED, resistors are typically used to limit the current by dissipating energy, also generating heat. Resultantly, additional space is needed to provide adequate cooling for the circuit components.

Also typical is the use of planar magnetics in conventional LED supporting circuitry. A planar magnetic implementation uses a high frequency power converter that causes electromagnetic interference. Bulky filters are then used to suppress the interference generated by the power converter. Both the inductors used in the planar magnetics and the filters add bulk to the LED supporting circuitry.

BRIEF DESCRIPTION

In accordance with one aspect, a power converter circuit for supplying power to a light emitting diode is provided. A voltage source supplies power to the circuit. A first switch is connected to the voltage source. A second switch is also connected to the voltage source. The second switch is in parallel to the first switch with respect to the voltage source. A first capacitor stores charge during a conductive state of the first switch. A second capacitor stores charge during a conductive state of the second switch. At least one light emitting diode illuminates upon receiving forward current from at least one of the first and second switches.

In accordance with another aspect, an AC to DC converter for limiting current to a light emitting diode consisting of only non-inductive components is provided. A voltage source provides power to the converter. A first switch is connected to the voltage source. A second switch is also connected to the voltage source. The second switch is in parallel to the first switch with respect to the voltage source. A first capacitor stores charge during a conductive state of the first switch. A second capacitor stores charge during a conductive state of the second switch. At least one light emitting diode illuminates upon receiving forward current from at least one of the first and second switches.

In accordance with another aspect, a method of limiting current to a light emitting diode using only non-inductive components is provided. First and second switches are placed in a parallel relationship with respect to a voltage source for providing current to a light emitting diode. A first current limiting capacitor is connected between the first switch and the voltage source. A second current limiting capacitor is connected between the second switch and the voltage source. The current across the light emitting diode is sensed with a current sensing resistor

DETAILED DESCRIPTION

Figure 1:
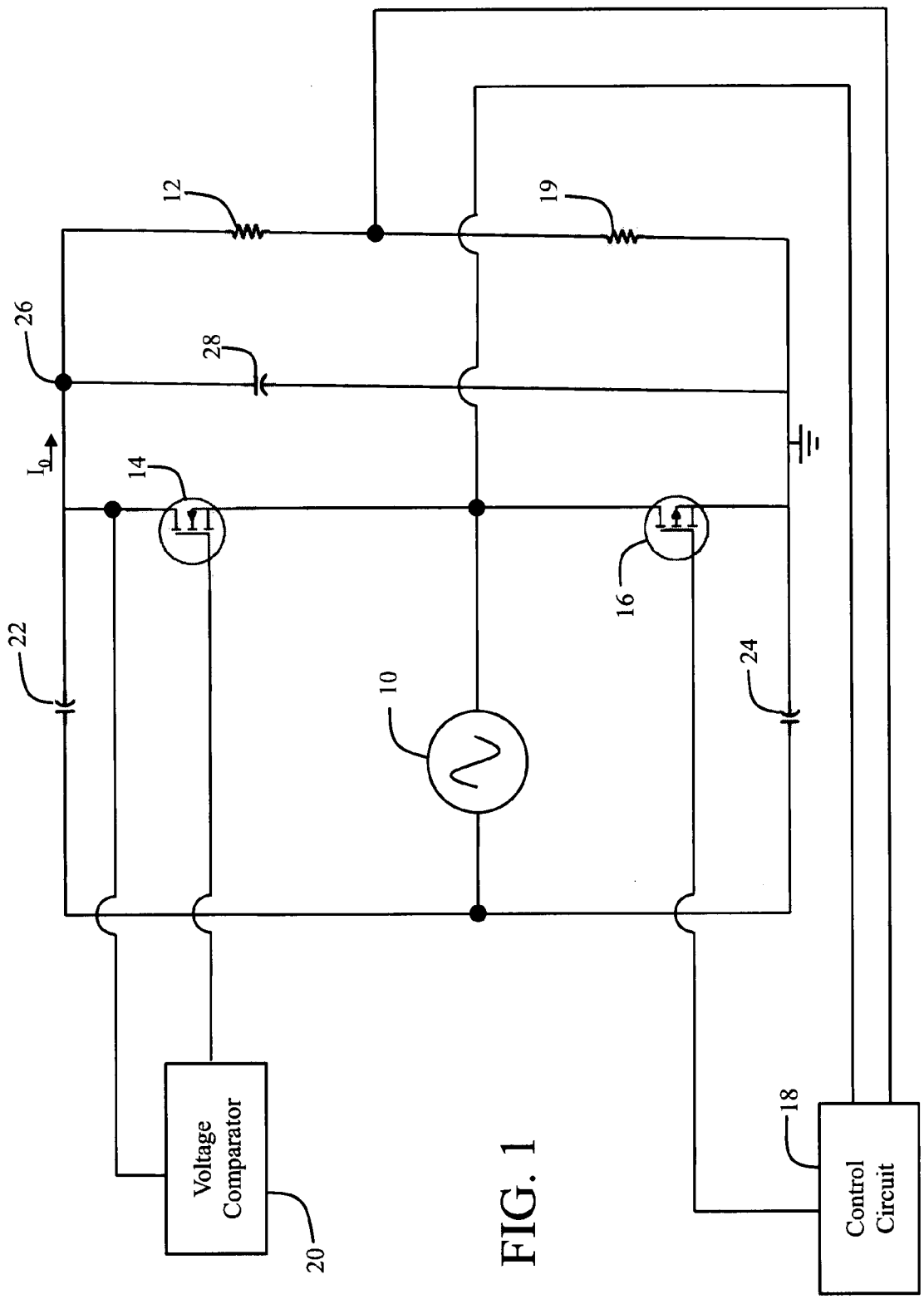
FIG. 1 depicts a circuit diagram of an OLED power converter in accordance with the present application.

With reference to FIG. 1, an exemplary AC to DC power converter for supplying power to an LED is depicted. A voltage source 10 supplies an AC signal that powers an LED 12. In one embodiment, the voltage source 10 is a typical line voltage, such as a 60 Hz 120 V rms signal, and the LED is an organic LED (OLED). Of course, sources with different values could be used without departing from the scope of the claims. Operation at the power line frequency gives the added advantage of producing no interference within FCC regulatory bands.

A first switch 14 and a second switch 16 are connected to the source 10 and are in parallel with one another with respect to the source 10. The switches 14, 16 act as selective gates for a traditional charge pump circuit. The switches 14, 16 are conventional power MOSFETs in one embodiment. A thin profile, D-pack MOSFET can be used, and possibly mounted to the back of a circuit board to save room. The switches 14, 16 are turned on as soon as a negative drain-source voltage is sensed. In effect, the transistor switches 14, 16 act as diodes in the sense that they respond to a positive forward voltage. Instead of utilizing the intrinsic body diode of the transistor, however, the channel of the transistor is used, improving efficiency and reducing the conduction loss.

A control circuit 18 senses the drain-source voltage of the second transistor switch 16. In the depicted embodiment, the transistor switches 14, 16 are enhancement-type MOSFETs. An n-channel enhancement-type MOSFET conducts whenever a control signal is applied to its gate. When the control circuit 18 senses a negative drain-source voltage across the second transistor switch 16, the control circuit applies a control signal to the gate of the second transistor switch 16. This causes the channel of the second transistor switch 16 to conduct current. The control circuit is able to regulate the current through an error amplifier that senses the output current via a small sense resistor 19 placed in series with the LED 12. In one embodiment, the control circuit 18 is embodied in a low-power integrated circuit that operates at 1-1000 µW per channel, such as a micropower logic circuit.

Figure 2:
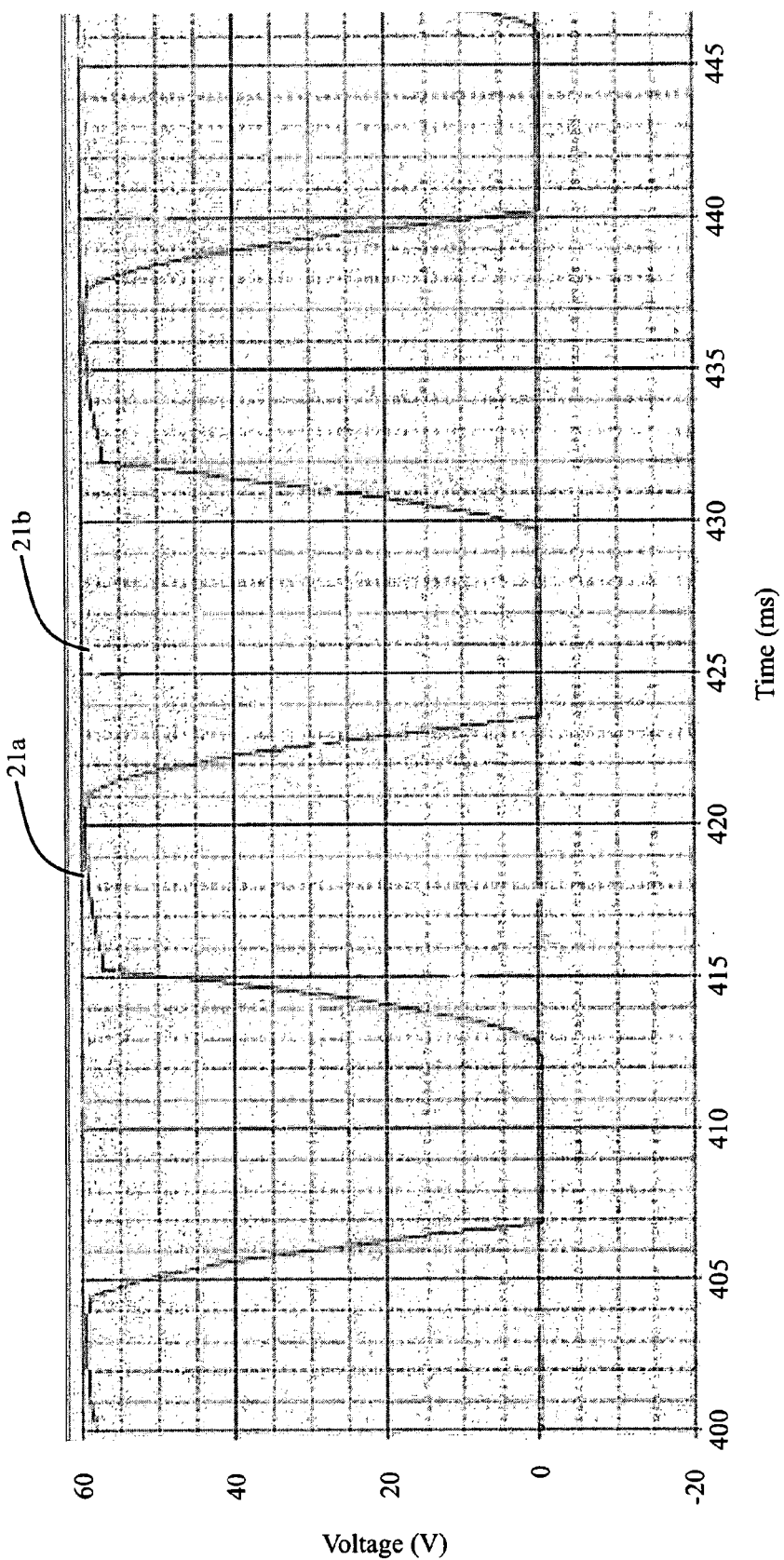
FIG. 2 is a voltage comparison over time of signals across transistor switches, in accordance with the present application.

A voltage comparator 20 similarly controls the first transistor 14. When a negative drain-source voltage is sensed across the first transistor switch 14, the voltage comparator 20 applies a control signal to the gate of the first transistor switch 14, turning it conductive. Due to the circuit layout, the transistor switches 14, 16 alternate periods of conduction. The voltage comparator 20 is the slave in a master-slave relationship with the control circuit 18. The voltage comparator 20 merely responds to the voltages it senses based on the operation of the second switch 16. The control circuit 18 does not allow the switches 14, 16 to both be conductive during the same period of time. This can be seen in FIG. 2. Signal 21a is the voltage across the first transistor switch 14, and signal 21b is a complementary voltage across the second transistor switch 16. As mentioned previously, when one switch is conductive, the other switch is non-conductive. In one embodiment, the voltage comparator 20, like the control circuit 18 is embodied in a micropower logic circuit.

With reference again to FIG. 1, energy is stored in a first current limiting capacitor 22 and a second current limiting capacitor 24. By varying the conduction times of the switches 14, 16, the stored energy is delivered to an output node 26. As their names suggest, the current limiting capacitors 22, 24 limit the current flow across the light emitting diode 12. The current ($I_O$) seen at the output node 26 is determined by the reactance of the current limiting capacitors 22, 24. The current $I_O$ is shared by the light emitting diode 12 and a storage capacitor 28. When the switch 14 is not conductive, energy stored in the storage capacitor 28 can be discharged to power the light emitting diode 12. In one embodiment, the value of the storage capacitor 28 is much greater than the values of the current limiting capacitors 22, 24. In one embodiment, the capacitors 22, 24, 28 are ceramic capacitors. Ceramic capacitors are thin and highly heat tolerant, so they make good candidates for inclusion in a circuit where one of the objects is to make it as thin as possible.

In one embodiment, the desired output current ($I_O$) is 300 mA. Knowing that desired value, and the rms value of the input voltage $V_{in}$, the necessary impedance $X_c$ (in Ohms) of the current limiting capacitors 22, 24 can be found by the relationship:

$$X_c = \frac{\sqrt{2}\, V_{in}}{\pi I_0}$$

Then, since capacitance is related to impedance by the frequency f of the signal, the necessary capacitance values of the current limiting capacitors 22, 24 can be found by the following relationship if the frequency is known.

$$C = \frac{1}{2\pi f X_c}$$

Figure 3:
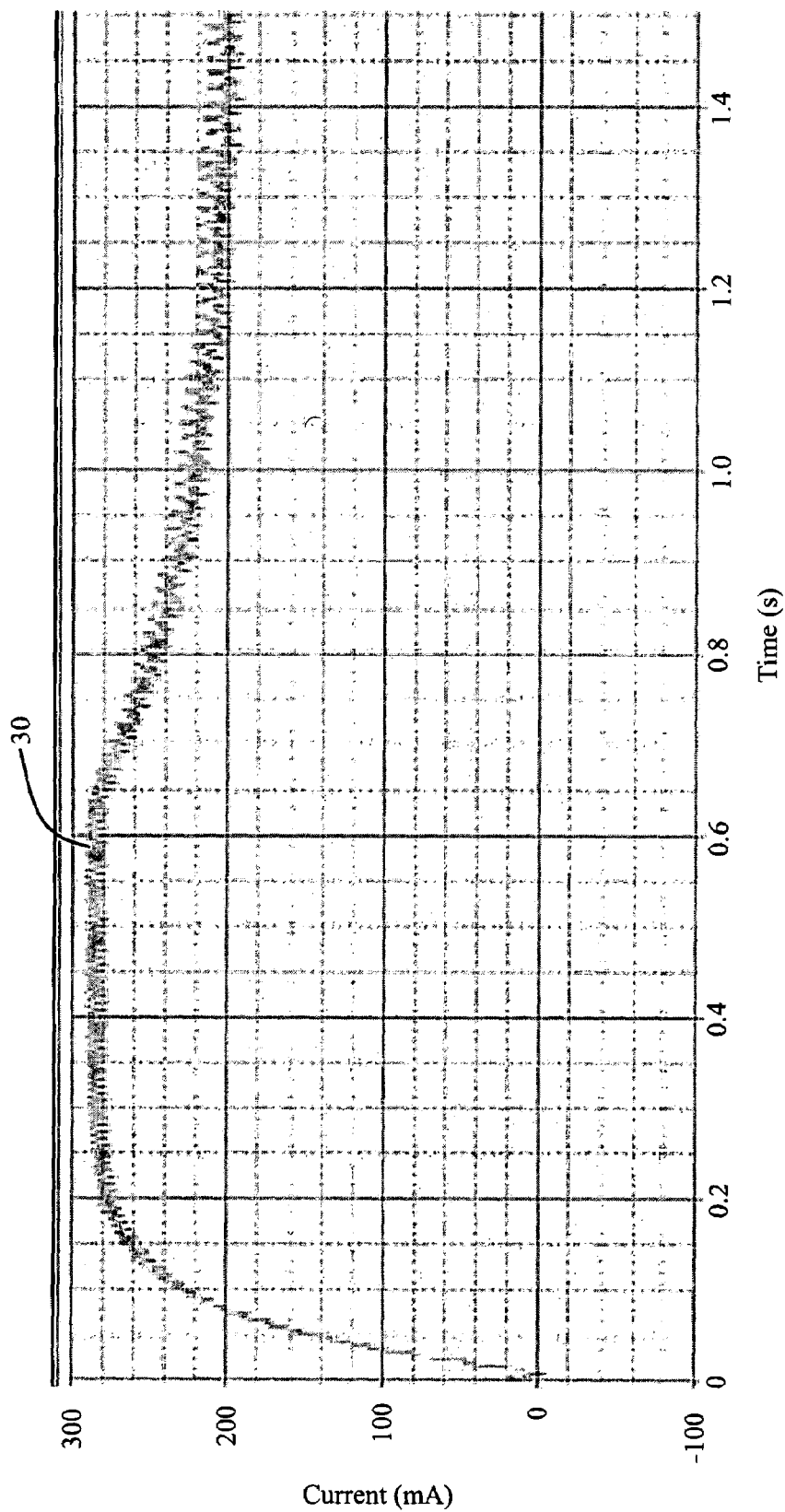
FIG. 3 is a graph depicting current across a light emitting diode with respect to time in accordance with the present application.
Figure 4:
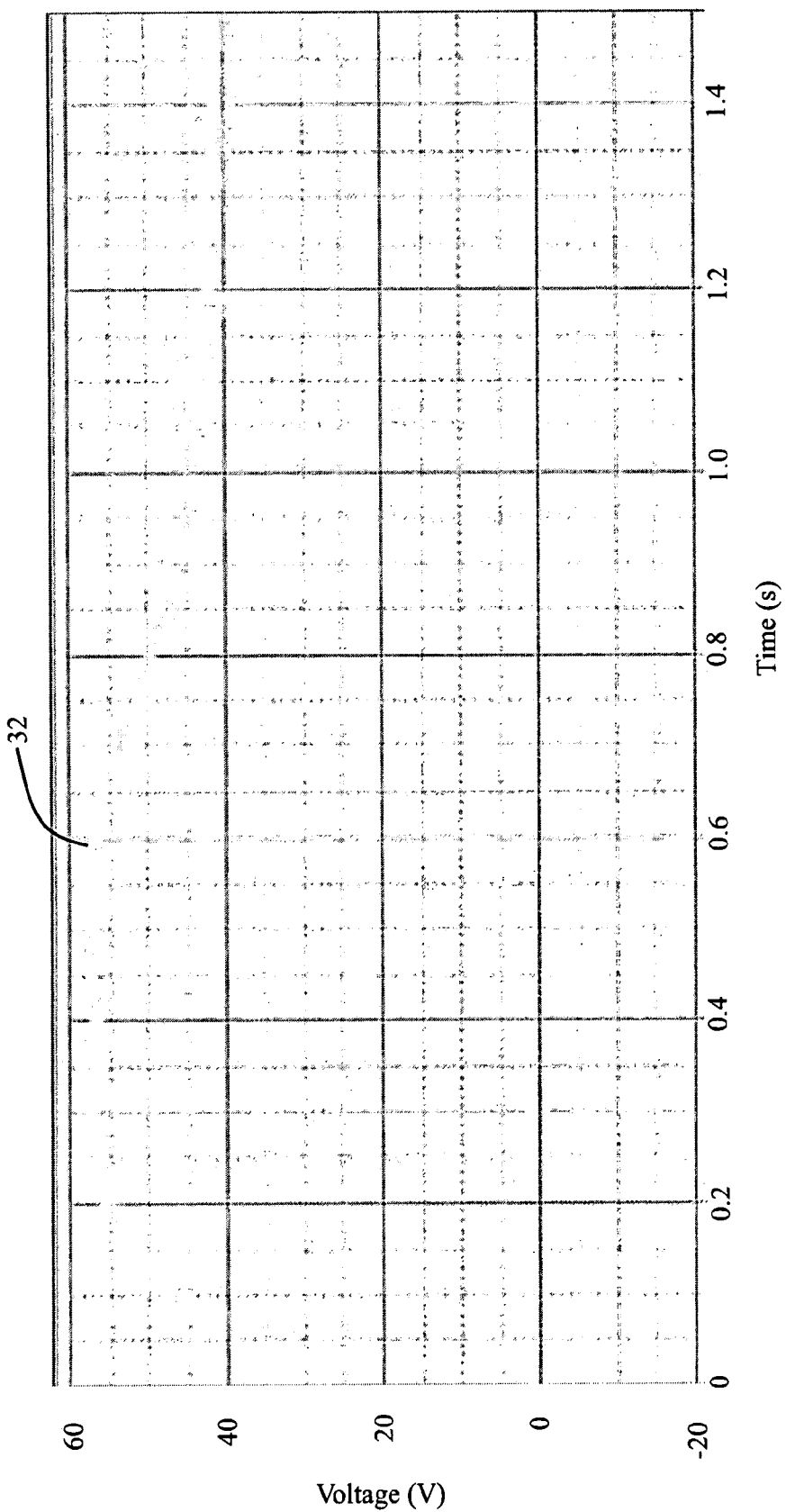
FIG. 4 is a graph depicting voltage across the light emitting diode with respect to time in accordance with the present application.

Thus, in one embodiment, where the voltage source 10 is a typical line voltage of 120 V at 60 Hz, and the desired output current is 300 mA, the approximate value of the capacitors is 14.73 µF. Using that capacitance value for the current limiting capacitors 22, 24, the current signal 30 as shown in FIG. 3 results across the OLED 12, and the voltage 32 as shown in FIG. 4 results across the OLED 12.

It is to be noted that the output current $I_O$ is regulated without the use of any inductive or resistive circuit components. The absence of inductors means that there will be no electromagnetic interference generated, and thus obviates the need for electromagnetic shielding, filtration, or compensation. Further, there is no need to worry about magnetic coupling between components. This simplifies the converter. Since an inductor is typically bulky compared to other circuit elements, eliminating them also saves space and reduces the physical profile of the circuit once it is mounted to a circuit board. In one embodiment, the power converter can be contained in a space with a vertical profile of less than 10 mm.

As noted above, current limiting resistive components have also been eliminated. Typically, resistors can be used to limit current by dissipating energy in the form of heat. Resistive components are typically the first components to fail due to overheating. Thus, by eliminating current-limiting resistive components, the profile of the converter can be further reduced because not as much space is needed to allow for cooling. The elimination of the inductive and resistive components reduces size and increases reliability and life of the power converter.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A power converter circuit for supplying power to a light emitting diode comprising:
   a voltage source;
   a first switch connected to the voltage source;
   a second switch connected to the voltage source, the second switch being in parallel to the first switch with respect to the voltage source;
   a first capacitor for storing charge during a conductive state of the first switch;
   a second capacitor for storing charge during a conductive state of the second switch; and,
   at least one light emitting diode that illuminates upon receiving forward current from at least one of the first and second switches;
   wherein the first and second capacitors limit the current provided to the light emitting diode.

2. The power converter circuit as set forth in claim 1, further including:
   an energy storage capacitor that stores charge from at least the first capacitor.

3. The power converter circuit as set forth in claim 1, further including:
   a current sensing resistor in a series relationship with the light emitting diode to sense and regulate the current through the light emitting diode.

4. The power converter circuit as set forth in claim 1, further including:
   a control circuit that controls the conductive state of the second switch.

5. The power converter circuit as set forth in claim 4, further including:
   a voltage comparator that senses a source-drain voltage of the first switch and controls the conductive state of the first switch based on the conductive state of the second switch.

6. The power converter as set forth in claim 5, wherein the voltage comparator and the control circuit are micropower logic circuits.

7. The power converter as set forth in claim 1, wherein the value of the first and second capacitors, C, is based on the relationship:

$$C = \frac{1}{2\pi f X_c}$$

where $X_c$ is the impedance of the first and second capacitors in Ohms needed to adequately limit the current to the light emitting diode and $f$ is the frequency of the line signal in Hertz.

8. The power converter as set forth in claim 7, wherein the impedance of the first and second capacitors $X_c$ is found by the relationship:

$$X_c = \frac{\sqrt{2}\, V_{in}}{\pi I_0}$$

where $V_{in}$ is the RMS voltage of the voltage source and $I_0$ is the desired current through the light emitting diode.

9. The power converter as set forth in claim 8, wherein the value of the first and second capacitors is approximately 14.73 μF.

10. The power converter as set forth in claim 1, wherein the light emitting diode is an organic light emitting diode.

11. An AC to DC converter for limiting current to a light emitting diode consisting of only non-inductive components, the components comprising:
   a voltage source;
   a first switch connected to the voltage source;
   a second switch connected to the voltage source, the second switch being in parallel to the first switch with respect to the voltage source;
   a first capacitor for storing charge during a conductive state of the first switch;
   a second capacitor for storing charge during a conductive state of the second switch;
   at least one light emitting diode that illuminates upon receiving forward current from at least one of the first and second switches;
   a control circuit that controls the conductive state of the second switch; and
   a voltage comparator that senses a source-drain voltage of the first switch and controls the conductive state of the first switch based on the conductive state of the second switch.

12. The AC to DC converter as set forth in claim 11, wherein the light emitting diode is an organic light emitting diode.

13. The AC to DC converter as set forth in claim 11, further including an energy storage capacitor that stores charge from at least the first capacitor.

14. The AC to DC converter as set forth in claim 11, further including a current sensing resistor in a series relationship with the light emitting diode to sense and regulate the current through the light emitting diode.

15. The AC to DC converter as set forth in claim 11, wherein the voltage comparator and the control circuit are micropower logic circuits.

16. A method of limiting current to a light emitting diode using only non-inductive components comprising:
   placing first and second switches in a parallel relationship with respect to a voltage source for providing current to a light emitting diode;
   connecting a first current limiting capacitor between the first switch and the voltage source;
   connecting a second current limiting capacitor between the second switch and the voltage source; and,
   sensing the current across the light emitting diode with a current sensing resistor; and,
   controlling a period of conductivity of the first switch, which is complementary to the period of conductivity of the second switch, with a micropower logic voltage comparator.

17. The method as set forth in claim 16, further including:
   controlling a period of conductivity of the second switch with a micropower logic control circuit.

18. The method as set forth in claim 16, further including:
   charging a storage capacitor with the first and second current limiting capacitors;
   discharging the storage capacitor to at least partially power the light emitting diode.

19. The method as set forth in claim 16, wherein the light emitting diode is an organic light emitting diode.

20. A method of limiting current to a light emitting diode using only non-inductive components comprising:
   placing first and second switches in a parallel relationship with respect to a voltage source for providing current to a light emitting diode;
   connecting a first current limiting capacitor between the first switch and the voltage source;
   connecting a second current limiting capacitor between the second switch and the voltage source;
   sensing the current across the light emitting diode with a current sensing resistor;
   charging a storage capacitor with the first and second current limiting capacitors; and
   discharging the storage capacitor to at least partially power the light emitting diode.

21. The method as set forth in claim 20, further including controlling a period of conductivity of the second switch with a micropower logic control circuit.

22. The method as set forth in claim 20, wherein the light emitting diode is an organic light emitting diode.

* * * * *